United States Patent
Hou et al.

(10) Patent No.: US 11,316,703 B2
(45) Date of Patent: Apr. 26, 2022

(54) ACME CENTRALIZED MANAGEMENT SYSTEM AND LOAD BALANCING METHOD THEREOF

(71) Applicant: TrustAsia Technologies, Inc., Shanghai (CN)

(72) Inventors: Jianyong Hou, Shanghai (CN); Jin Cheng, Shanghai (CN); Qijing Chen, Shanghai (CN)

(73) Assignee: TrustAsia Technologies, Inc., Shanghai (CN)

( * ) Notice: Subject to any disclaimer, the term of this patent is extended or adjusted under 35 U.S.C. 154(b) by 0 days.

(21) Appl. No.: 17/382,391

(22) Filed: Jul. 22, 2021

(65) Prior Publication Data

US 2022/0029830 A1    Jan. 27, 2022

(30) Foreign Application Priority Data

Jul. 23, 2020 (CN) .......................... 202010718560.6

(51) Int. Cl.
*H04L 9/32* (2006.01)
*G06F 9/54* (2006.01)

(52) U.S. Cl.
CPC ............ *H04L 9/3263* (2013.01); *G06F 9/547* (2013.01)

(58) Field of Classification Search
CPC ............................... H04L 9/3263; G06F 9/547
USPC ......................................................... 713/175
See application file for complete search history.

(56) References Cited

U.S. PATENT DOCUMENTS

| 8,285,816 B2 * | 10/2012 | Adelman .......... H04L 29/12594 726/19 |
| 2019/0123914 A1 * | 4/2019 | Wei ....................... H04L 9/3247 |

FOREIGN PATENT DOCUMENTS

CN          107612697        1/2018

OTHER PUBLICATIONS

Barnes et al., Automatic Certificate Management Environment (ACME), Mar. 2019, Internet Engineering Task Force. (Year: 2019).*
Patrick Nohe, A Complete Introduction to the ACME Protocol, May 31, 2019, Internet. (Year: 2019).*

* cited by examiner

*Primary Examiner* — Farid Homayounmehr
*Assistant Examiner* — Thanh T Le
(74) *Attorney, Agent, or Firm* — JCIP Global Inc.

(57) ABSTRACT

The present invention relates to an ACME centralized management system and a load balancing method thereof. The system is connected with an ACME client and a plurality of certificate authorities (CAs) respectively and comprises an ACME unloading module, and a statistics module, a strategy module, a verification module and a notification module which are connected with the ACME unloading module respectively. The ACME unloading module is in communication with the ACME client and the plurality of certificate authorities (CAs). Compared with the prior art, the present invention has the advantages of avoiding frequent verification, quickly issuing certificate copies, more efficiently issuing certificates, etc.

8 Claims, 2 Drawing Sheets

ACME CENTRALIZED MANAGEMENT SYSTEM AND LOAD BALANCING METHOD THEREOF

CROSS-REFERENCE TO RELATED APPLICATION

This application claims the priority benefit of China application serial no. 202010718560.6 filed on Jul. 23, 2020. The entirety of the above-mentioned patent application is hereby incorporated by reference herein and made a part of this specification.

BACKGROUND

Technical Field

The present invention relates to the technical field of internet communication, in particularly to an ACME centralized management system and a load balancing method thereof.

Description of Related Art

ACME (Automatic Certificate Management Environment, rfc8555) protocol is an internet standard, whereby the user first installs an ACME client at a server node in need of certificate deployment through downloading, then designates a catalogue URL (Uniform Resource Locator) provided by a CA (Certificate Authority) through command lines, designates the type of a private key, a verification way, a verification path (file path or DNS (Domain Name System) service provider API (Application Programming Interface)), a deployment path, and a certificate reloading command, and finally completes application deployment of a certificate. The ACME client will periodically check whether a certificate list it maintains needs to be updated and automatically accomplish the last application action.

In practical applications, ACME as an automatic certificate application standard is very convenient and has also produced a plurality of clients for automatic certificate application and deployment based on the ACME protocol. An SSL (Secure Sockets Layer)/TLS (Transport Layer Security) certificate may be quickly and easily obtained in combination with the ACME clients (such as Let'sEncrypt free certificate), which leads to popularization of HTTPS (Hypertext Transfer Protocol Secure) and large-scale application of SSL/TLS certificates that HTTPS relies on, but also brings management problems:

1. There are few commercial certificate authorities (CAs) providing ACME for companies to choose.

The certificates issued by commercial certificate authorities (CAs) are of higher credibility and service assurance. At present, numerous commercial certificate authorities (CAs) do not support the ACME protocol, for on the one hand, it is a business strategy, and for example, DigiCert only attempts to provide ACME support for OV (Organization Validated) and EV (Extended Validation), not for DV (Domain Validated) in large-scale use, and provides ACME support for DV currently in a Beta stage; on the other hand, supporting ACME poses certain technical challenges and audit risks for traditional certificate authorities (CAs), and automation can also be achieved through APIs and if companies want to automate the management of certificates through the ACME protocol, there further need multiple alternative commercial certificate authorities (CAs), which becomes very passive.

2. A large number of ACME client nodes repeatedly apply for new certificates, resulting in high failure rates and increased costs.

An ACME client in normal use is deployed on each WEBSERVER server to generate an independent ACME account. Certificate application for the same domain name will cause a large number of certificate authority (CA) domain name ownership verifications, thereby leading to a long application time and a high failure rate, even triggering certificate authority (CA) rate limitations (for example, Let'sEncrypt is limited to 5 copies per week), and resulting in failure to apply for a certificate. At the same time, for the use of ACME to adapt to a commercial certificate authority (CA), if application of a new certificate is repeated, the current common accounting strategy of the commercial certificate authority (CA) will increase costs.

3. The certificate verification time is long, the issuing failure rate is too high due to problems such as caching, and the maintenance cost is high.

In order to verify the domain name ownership, it needs to be verified in a variety of ways, such as DNS and HTTP (Hypertext Transfer Protocol) file verification. DNS verification has a problem of the effective time of a verification value. When the verification value is added to a domain name service provider, the verification value fails to take effect in time, causing the issuing to fail. HTTP file verification requires users to have a high level of knowledge of operation and maintenance, and they need to ensure that the files can be accessed correctly, such as a path of.well-known/acme-challenge/<token> in the ACME protocol, which is prone to error in the actual operation.

4. The ACME client cannot automatically switch certificate brands due to network or failure of certificate authority (CA).

In use of the ACME client to apply for a certificate, certificate application and renewal in an automation process of the current client are to communicate with a fixed address, and the automatic certificate update fails due to network jitter (optical cable cutting) or major bugs in the certificate authority (CA). The application channels cannot be switched intelligently in the application process, causing the certificate application to fail.

5. The failure of the certificate application cannot be perceived.

The current ACME client communicates directly with the ACMEURL address provided by the certificate authority (CA). When the request fails due to network jitter or failure of the certificate authority (CA), the failure cannot be perceived, and adjustments cannot be made in time.

SUMMARY

The purpose of the present invention is to provide an ACME centralized management system and a load balancing method thereof so as to overcome the above defect existing in the prior art.

The purpose of the present invention may be achieved through the following technical solutions:

disclosed is an ACME centralized management system. The system is connected with an ACME client and a plurality of certificate authorities (CAs) respectively and comprises an ACME unloading module, and a statistics module, a strategy module, a verification module, and a notification module which are connected with the ACME unloading module respectively, the ACME unloading module being in communication with the ACME client and the plurality of certificate authorities (CAs).

A working process of the system comprises the following steps:

1) launching a certification application to the ACME unloading module by the ACME client, and then performing data analysis unloading by the ACME unloading module;

2) selecting a certificate authority (CA) through a strategy set by the strategy module and submitting an order to the corresponding certificate authority (CA) to start an application of a certificate by the ACME unloading module;

3) setting by the ACME unloading module a verification value through the verification module and performing a verification on the order through the certificate authority (CA); and 4) after the verification is passed, issuing by the ACME unloading module an application status notification through the notification module and making statistics of data through the statistics module.

A load balancing method of the ACME centralized management system comprises the following steps:

1) creating an ACME catalogue URL through the ACME centralized management system by a user to acquire a URL address which carries a token bound to the order;

2) acquiring by the ACME client an API list through the ACME catalogue URL;

3) the ACME client accomplishes account registration by calling a newNonce function and a newAccount API;

4) bringing a domain name message into the ACME centralized management system by calling the newNonce function and a newOrder API by the ACME client;

5) acquiring by the ACME centralized management system a corresponding strategy through the token in the ACME catalogue URL requested by the ACME client;

6) acquiring by the ACME centralized management system a corresponding order message through the token in the ACME catalogue URL requested by the ACME client;

7) creating a CA order with a domain name to be submitted to the certificate authority (CA) and without a CSR (Corporate Social Responsibility) by the ACME centralized management system;

8) returning ACME Authorization data carrying an order ID (Identity Card) and used for domain name ownership verification by the ACME centralized management system, cheating the ACME client during this step to indicate that a domain name of the ACME client has passed the verification, and sending a message that the domain name has passed the verification, so as to skip a verification process that traditional ACME clients are automatically configured to accomplish ACME domain name verification;

9) generating by the ACME client a private key and a CSR and submitting the order ID and the CSR to the ACME centralized management system by calling the newNonce function and a finalizeOrder function;

10) submitting by the ACME centralized management system the CA order to be submitted with the CSR to the certificate authority (CA) to acquire a domain name verification message, and calling the verification module for domain name verification;

11) receiving by the verification module the domain name to be verified and the verification value and setting a verification value through file proxy and DNS CNAME (Canonical Name Record) authorization;

12) calling by the ACME centralized management system a CA certificate to acquire an API and issuing and returning certificate contents after completion of the domain name verification by the certificate authority (CA); and 13) returning by the ACME centralized management system the certificate contents to the ACME client according to an ACME protocol manner to accomplish a certificate issuing process.

In the step 7), when the order forms a competitive relationship among a plurality of ACME clients, conflicts caused by the plurality of ACME clients requesting a same ACME catalogue URL at a same time are avoided by adding a mutex to the order and a same subsequent request is suspended.

In the step 7), for the ACME clients acquiring the mutex, creating a CA order with a domain name to be submitted to the certificate authority (CA) and without a CSR by the ACME centralized management system.

After completion of a certificate issuing process of the ACME client A among the plurality of ACME clients having a competitive relationship according to the steps 1) to 13), for an ACME client B among the plurality of ACME clients having a competitive relationship, a certificate issuing process is completed through the following steps:

14) after the ACME centralized management system releases the mutex of the ACME client A, acquiring by the ACME client B the mutex, as well as a CA order number created by the ACME client A;

15) repeating the steps 8) and 9) by the ACME client B;

16) submitting by the ACME centralized management system the submitted CA order with the CSR to the certificate authority (CA) to acquire a domain name verification message, and calling the verification module for domain name verification; and 17) repeating the steps 11) to 13) to accomplish the certificate issuing process of the ACME client B.

For the other ACME clients among the plurality of ACME clients having a competitive relationship, a certificate issuing process is sequentially completed according to the steps 14)-17).

In the step 11), an ownership verification is performed through a domain name verification manner bound to a strategy of the order acquired by the token in the ACME catalogue URL requested by the ACME client.

When the domain name verification manner bound to the strategy is the file proxy, the domain name ownership verification is verified through the following steps:

1101) receiving by the verification module a domain name to be verified and a verification value and storing the domain name as Key and the verification value as Value into a KV memory;

1102) when performing a domain name verification, requesting by the certificate authority (CA) an HTTP or HTTPS address of the domain name, subjecting the domain name ownership verification of the certificate authority (CA) to reverse proxy to the verification module, and carrying a domain name as a Host header field of an HTTP request through rules of the file proxy to the ACME centralized management system as preset by a user;

1103) obtaining by the verification module the domain name to be verified by acquiring the Host header field of the HTTP request of the reverse proxy; and 1104) acquiring by the verification module a corresponding verification value from the KV memory through the domain name and returning the corresponding verification value to the certificate authority (CA) through an HTTP text.

When the domain name verification manner bound to the strategy is DNS CNAME authorization, the domain name ownership verification is completed through the following steps:

1111) receiving by the verification module a domain name to be verified and a verification value and storing the domain name as Key and the verification value as Value into a KV memory;

1112) when the certificate authority (CA) performs domain name verification, requesting a DNS TEXT record of the domain name, the domain name pointing to a DNS CNAME proxy domain name provided by a DNS resolution service provided by the verification module through a DNS CNAME record configured by a user in the DNS resolution service in advance;

1113) resolving a domain name verification request made by the certificate authority (CA) by the DNS resolution service provided by the proxy verification module;

1114) acquiring by the DNS resolution service a DNS text resolution request of the DNS CNAME proxy domain name requested by the certificate authority (CA) and obtaining the requested domain name by extracting a domain name prefix in the request; and 1115) acquiring by the verification module a corresponding verification value from the KV memory through the domain name and returning the corresponding verification value to the certificate authority (CA) through the DNS TXT (Text) record.

Compared with the prior art, the present invention has the following advantages that:

1. By proxy of the system among the ACME client, the system, and the CA, the statistics of certificate issuing status can be accomplished, thus avoiding application of the same certificate from frequent verification by multiple server nodes, and efficiently improving the success rate of certificate authorization in combination with related strategies.

2. When multiple ACME client nodes apply for a certificate simultaneously, the order number is obtained by first processing the first request and suspending other requests until the first request is responded, and other requests quickly performs reissue processing on this order through a reissue mechanism, such that new orders need not be generated, domain name verification may be skipped at the same time, and a copy of the certificate may be quickly issued.

3. The present invention achieves more efficient certificate issuing application, visual application charts, and lower issuing costs based on the ACME protocol and in combination with the ACME unloading module, the statistics module, the strategy module, the verification module, and the notification module.

DESCRIPTION OF THE EMBODIMENTS

The present invention will be described in detail with reference to the accompanying figures and specific examples hereinafter.

EXAMPLES

Figure 1:
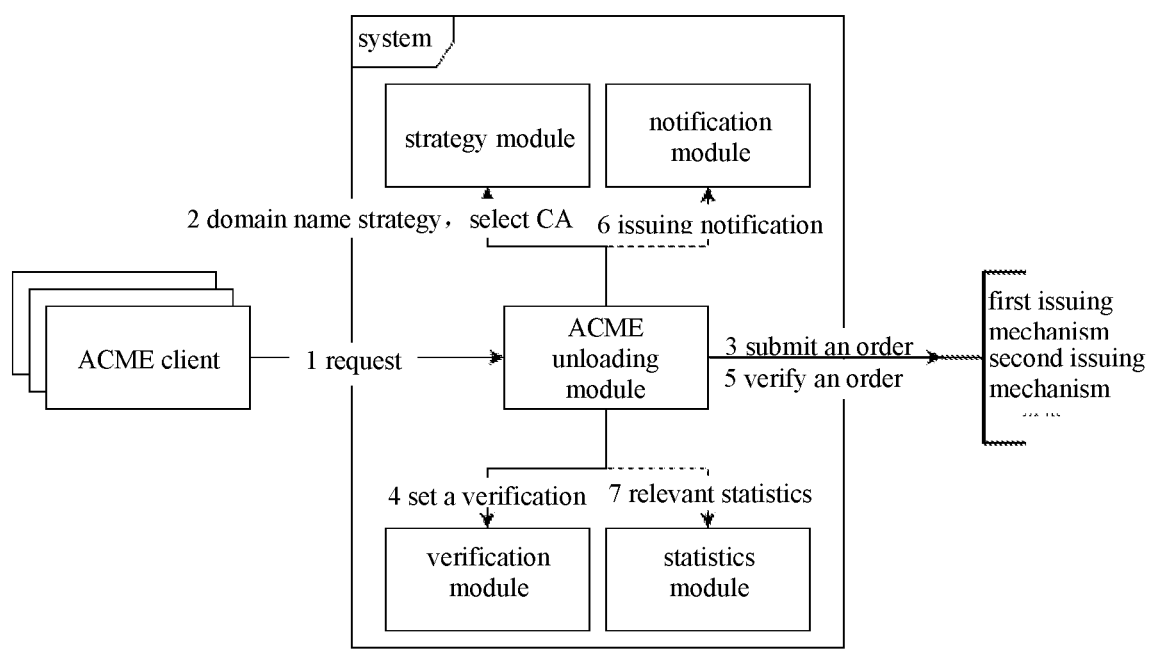
FIG. 1 is a functional block diagram of an ACME centralized management system.

As shown in FIG. 1, the present invention provides an ACME centralized management system and a load balancing method thereof, and a basic process of the present invention is as below:

first, launching a certification application by the ACME client, performing data analysis unloading by the ACME unloading module, starting an application of a certificate through a strategy specified by the strategy module, quickly setting a verification value through the verification module, timely notifying a user of an application status by the notification module, and finally forming data that can be seen by the statistics module.

Figure 2:
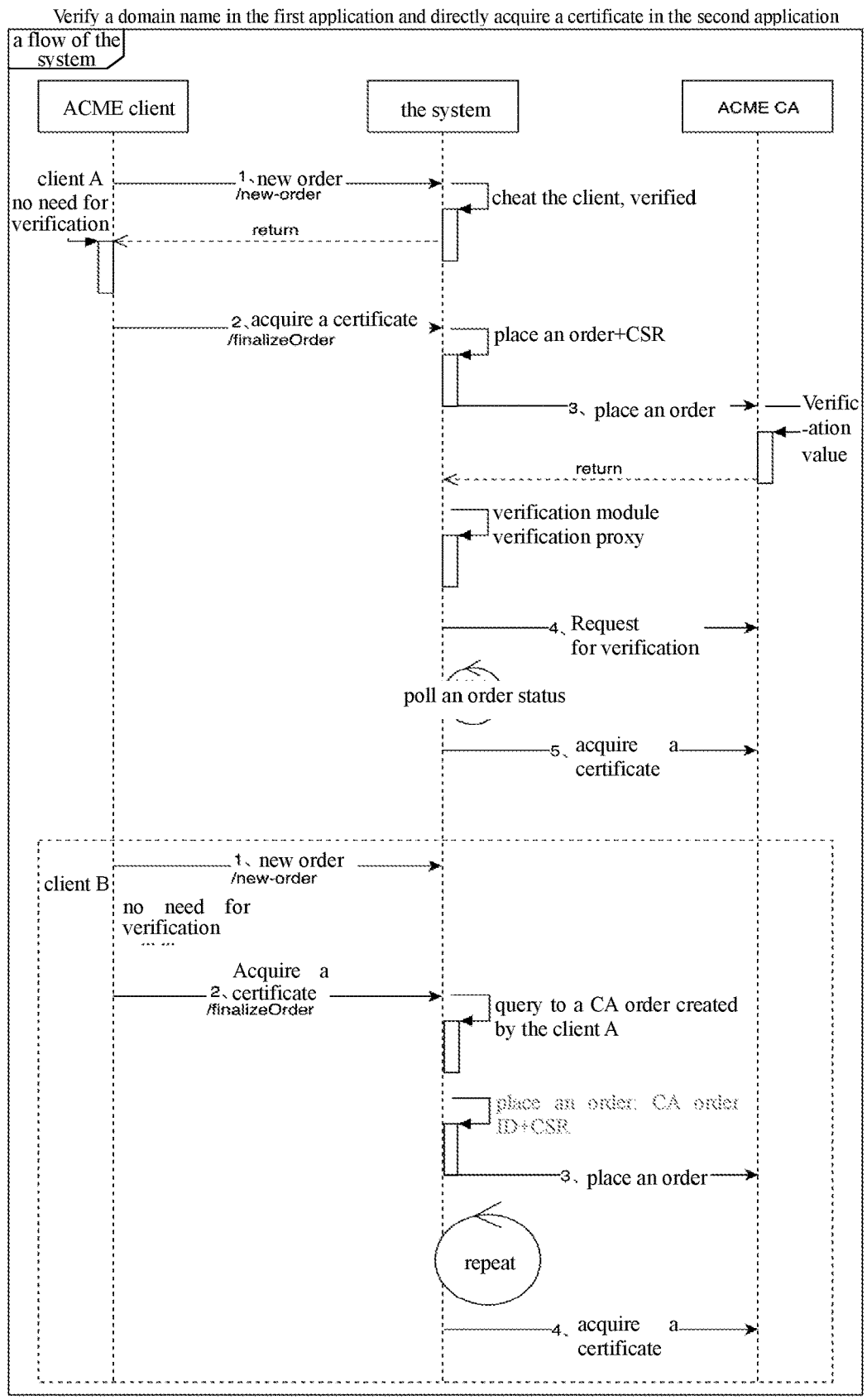
FIG. 2 is a flow chart of a load balancing method.

As shown in FIG. 2, a process of the load balancing method provided by the present invention is as below:

the ACME unloading module as a core of the whole system provides token authentication and an ACME client API and links up with functions of each CA system. As shown in FIG. 1, all functional processes start from the ACME unloading module, and the specific process is:

1) creating an ACME catalogue URL in the system by a user to acquire an address, the address carrying a token bound to the order, such as TjI2c2h6cGNfaDAyeUhBVTZ-fMWEzMWQ3ODg3ODgwMmMzYTI2NTU5MDZ1;

2) acquiring by the ACME client an API list through the ACME catalogue URL;

3) accomplishing account registration by calling a newNonce function and a newAccount API by the ACME client;

4) bringing a domain name message (such as example. com) into the system by calling the newNonce function and a newOrder API by the ACME client;

5) acquiring by the system a corresponding strategy through the token in the ACME catalogue URL requested by the ACME client so as to judge whether continuing is allowed;

6) acquiring by the system a corresponding order through the token in the ACME catalogue URL requested by the ACME client;

7) when the order may form a competitive relationship between the ACME client A and the ACME client B, solving conflicts caused by a plurality of ACME clients requesting a same ACME catalogue URL at a same time by adding a mutex to the order, and suspending a same subsequent request;

8) supposing the ACME client A acquires the mutex, creating by the system a CA order (without a CSR) with a domain name example.com to be submitted to the certificate authority (CA);

9) returning ACME Authorization data (for domain name ownership verification) carrying an order ID by the system, and cheating the ACME client by the system during this step to indicate that the domain name example.com has passed the verification, so as to skip a verification process that traditional ACME clients are automatically configured to accomplish ACME domain name verification (automatically accomplishing the domain name verification through the verification module after subsequently receiving the CSR);

10) generating by the ACME client a private key and a CSR and submitting the order ID and the CSR to the system by calling the newNonce function and a finalizeOrder function;

11) submitting by the system the CA order to be submitted with the CSR to the certificate authority (CA) to acquire a domain name verification message, and calling the verification module for domain name verification; and 12) receiving by the verification module the domain name example.com to be verified and the verification value and setting a verification value through file proxy and DNS CNAME authorization.

Specifically, when the domain name verification manner bound to the strategy is the file proxy, the domain name ownership verification is verified through the following steps:

1) receiving by the verification module the domain name to be verified and the verification value and storing the domain name as Key and the verification value as Value into a KV memory;

2) when the certificate authority (CA) performs domain name verification, requesting an HTTP (Port 80) or HTTPS (Port 443) address of the domain name subjecting the domain name ownership verification of the certificate authority (CA) to reverse proxy to the verification module, and carrying the domain name example.com as a Host header field of an HTTP request through rules of the file proxy to the ACME centralized management system as preset by a user;

3) obtaining by the verification module the domain name to be verified by acquiring the Host header field of the HTTP request of the reverse proxy; and 4) acquiring by the verification module a corresponding verification value from the KV memory through the domain name example.com and returning the corresponding verification value to the certificate authority (CA) through an HTTP text.

When the domain name verification manner bound to the strategy is DNS CNAME authorization, the domain name ownership verification is completed through the following steps:

1) receiving by the verification module a domain name to be verified and a verification value and storing the domain name as Key and the verification value as Value into a KV memory;

2) when the certificate authority (CA) perform domain name verification, requesting a DNS TXT record of the domain name (such as _dnsauth.example.com), the domain name pointing to a DNS CNAME proxy domain name (such as example.com.dcv.httpsauto.com) provided by a DNS resolution service (for example, NS is dcv.httpsauto.com) provided by the verification module through a DNS CNAME record configured by a user in the DNS resolution service in advance;

3) subjecting a domain name verification request made by the certificate authority (CA) to the DNS resolution service provided by the proxy verification module;

4) acquiring by the DNS resolution service a DNS TXT resolution request of the DNS CNAME proxy domain name example.com.dcv.httpsauto.com requested by the certificate authority (CA) and obtaining the requested domain name example.com by extracting a domain name prefix in the request;

5) acquiring by the verification module a corresponding verification value from the KV memory through the domain name and returning the corresponding verification value to the certificate authority (CA) through the DNS TXT record;

6) calling by the system a CA certificate to acquire an API and issuing and returning certificate contents after completion of the domain name verification by the certificate authority (CA);

7) returning by the system the certificate contents to the ACME client according to an ACME protocol manner to accomplish a certificate issuing process;

8) after the system releases the mutex of the ACME client A, acquiring by the ACME client B the mutex, as well as a CA order number created by the ACME client A;

9) repeating the steps 9) and 10) by the ACME client B;

10) submitting by the system the submitted CA order with the CSR to the certificate authority (CA) to acquire a domain name verification message, and calling the verification module for domain name verification; and 11) repeating the steps 12) to 14) to accomplish the certificate issuing process.

What is claimed is:

1. An ACME (Automatic Certificate Management Environment) centralized management system comprising a processor and a non-transitory computer-readable medium comprising instructions executed by the processor, wherein the system is connected with an ACME client and a plurality of certificate authorities (CAs) respectively and comprises an ACME unloading module, and a statistics module, a strategy module, a verification module, and a notification module which are connected with the ACME unloading module respectively, the ACME unloading module being in communication with the ACME client and the plurality of certificate authorities (CAs);

wherein a working process of the system comprises the following steps:

1) launching a certification application to the ACME unloading module by the ACME client, and then performing data analysis unloading by the ACME unloading module;

2) selecting by the ACME unloading module a certificate authority (CA) through a strategy set by the strategy module and submitting an order to the certificate authority (CA) to start an application of a certificate;

3) setting by the ACME unloading module a verification value through the verification module and performing a verification on the order through the certificate authority (CA); and 4) after the verification is passed, issuing by the ACME unloading module an application status notification through the notification module and making statistics of data through the statistics module;

wherein the ACME unloading module, the statistics module, the strategy module, the verification module, and the notification module are executed by the processor of the ACME centralized management system;

wherein a load balancing method of the ACME centralized management system comprises the following steps:

1) creating an ACME catalogue URL (Uniform Resource Locator) through the ACME centralized management system by a user to acquire a URL address which carries a token bound to the order;

2) acquiring by the ACME client an API (Application Programming Interface) list through the ACME catalogue URL;

3) accomplishing account registration by calling a newNonce function and a newAccount API by the ACME client;

4) bringing a domain name message into the ACME centralized management system by calling the newNonce function and a newOrder API by the ACME client;

5) acquiring by the processor of the ACME centralized management system a corresponding strategy through the token in the ACME catalogue URL which is requested by the ACME client;

6) acquiring by the processor of the ACME centralized management system a corresponding order message through the token in the ACME catalogue URL which is requested by the ACME client;

7) creating a CA order with a domain name to be submitted to the certificate authority (CA) and without a CSR (Corporate Social Responsibility) by the ACME centralized management system;

8) returning ACME Authorization data carrying an order ID (Identity Card) and used for a domain name ownership verification by the ACME centralized management system, cheating the ACME client during this step to indicate that a domain name of the ACME client has passed the verification, and sending a message that the domain name has passed the verification, so as to skip a verification process that traditional ACME clients are automatically configured to accomplish an ACME domain name verification;

9) generating by the ACME client a private key and a CSR and submitting the order ID and the CSR to the processor of the ACME centralized management system by calling the newNonce function and a finalizeOrder function;

10) submitting by the processor of the ACME centralized management system the CA order to be submitted with the CSR to the certificate authority (CA) to acquire a domain name verification message, and calling the verification module for a domain name verification;

11) receiving by the verification module the domain name to be verified and the verification value and setting the verification value through a file proxy and a DNS CNAME (Domain Name System Canonical Name Record) authorization;

12) calling by the processor of the ACME centralized management system a CA certificate to acquire an API and issuing and returning certificate contents after completion of the domain name verification by the certificate authority (CA); and 13) returning by the processor of the ACME centralized management system the certificate contents to the ACME client according to an ACME protocol manner to accomplish a certificate issuing process.

2. The ACME centralized management system according to claim 1, wherein in the step 7), when the order forms a competitive relationship among a plurality of ACME clients, conflicts caused by the plurality of ACME clients requesting a same ACME catalogue URL at a same time are avoided by adding a mutex to the order and a same subsequent request is suspended.

3. The ACME centralized management system according to claim 2, wherein in the step 7), for the ACME clients acquiring the mutex, creating the CA order with a domain name to be submitted to the certificate authority (CA) and without the CSR by the ACME centralized management system.

4. The ACME centralized management system according to claim 2, wherein after completion of a certificate issuing process of an ACME client A among the plurality of ACME clients having a competitive relationship according to the steps 1) to 13), for an ACME client B among the plurality of ACME clients having a competitive relationship, a certificate issuing process is completed through the following steps:

14) after the ACME centralized management system releases the mutex of the ACME client A, acquiring by the ACME client B the mutex, as well as a CA order number created by the ACME client A;

15) repeating the steps 8) and 9) by the ACME client B;

16) submitting by the ACME centralized management system the submitted CA order with the CSR to the certificate authority (CA) to acquire the domain name verification message, and calling the verification module for the domain name verification; and 17) repeating the steps 11) to 13) to accomplish the certificate issuing process of the ACME client B.

5. The ACME centralized management system according to claim 4, wherein for the other ACME clients among the plurality of ACME clients having a competitive relationship, a certificate issuing process is sequentially completed according to the steps 14)-17).

6. The ACME centralized management system according to claim 2, wherein in the step 11), an ownership verification is performed through a domain name verification manner bound to a strategy of the order acquired by the token in the ACME catalogue URL which is requested by the ACME client.

7. The ACME centralized management system according to claim 6, wherein when the domain name verification manner bound to the strategy is the file proxy, the domain name ownership verification is verified through the following steps:

1101) receiving by the verification module a domain name to be verified and a verification value and storing the domain name as Key and the verification value as Value into a KV memory;

1102) when performing the domain name verification, requesting by the certificate authority (CA) an HTTP (Hypertext Transfer Protocol) or HTTPS (Hypertext Transfer Protocol Secure) address of the domain name, subjecting the domain name ownership verification of the certificate authority (CA) to reverse proxy to the verification module, and carrying a domain name as a Host header field of an HTTP request through rules of the file proxy to the ACME centralized management system as preset by a user;

1103) obtaining by the verification module the domain name to be verified by acquiring the Host header field of the HTTP request of the reverse proxy; and 1104) acquiring by the verification module a corresponding verification value from the KV memory through the domain name and returning the corresponding verification value to the certificate authority (CA) through an HTTP text.

8. The ACME centralized management system according to claim 6, wherein when the domain name verification manner bound to the strategy is the DNS CNAME authorization, the domain name ownership verification is completed through the following steps:

1111) receiving by the verification module a domain name to be verified and a verification value and storing the domain name as Key and the verification value as Value into a KV memory;

1112) when the certificate authority (CA) performs the domain name verification, requesting a DNS TXT (Domain Name System Test) record of the domain name, the domain name pointing to a DNS CNAME proxy domain name provided by a DNS resolution service provided by the verification module through a DNS CNAME record configured by a user in the DNS resolution service in advance;

1113) subjecting a domain name verification request made by the certificate authority (CA) to the DNS resolution service provided by the proxy verification module;

1114) acquiring by the DNS resolution service a DNS TXT resolution request of the DNS CNAME proxy domain name requested by the certificate authority (CA), and obtaining the requested domain name by extracting a domain name prefix in the request; and 1115) acquiring by the verification module a corresponding verification value from the KV memory through the domain name and returning the corresponding verification value to the certificate authority (CA) through the DNS TXT record.

* * * * *